United States Patent
Luo et al.

(10) Patent No.: US 7,330,493 B2
(45) Date of Patent: Feb. 12, 2008

(54) METHOD, APPARATUS AND MODULE USING SINGLE LASER DIODE FOR SIMULTANEOUS PUMP OF TWO GAIN MEDIA CHARACTERISTIC OF POLARIZATION DEPENDENT ABSORPTION

(75) Inventors: Ningyi Luo, Fremont, CA (US); Sheng-Bai Zhu, Fremont, CA (US); Li Wu, Fuzhou (CN)

(73) Assignee: Pavilion Integration Corporation

( * ) Notice: Subject to any disclaimer, the term of this patent is extended or adjusted under 35 U.S.C. 154(b) by 287 days.

(21) Appl. No.: 11/143,127

(22) Filed: Jun. 1, 2005

(65) Prior Publication Data
US 2006/0274808 A1 Dec. 7, 2006

(51) Int. Cl.
*H01S 5/00* (2006.01)
(52) U.S. Cl. .................. 372/50.1; 372/50.121
(58) Field of Classification Search .................. 372/68
See application file for complete search history.

(56) References Cited

U.S. PATENT DOCUMENTS

| | | | |
|---|---|---|---|
| 6,137,820 A | 10/2000 | Maag et al. | |
| 6,876,784 B2 | 4/2005 | Nikolov et al. | |
| 6,900,899 B2* | 5/2005 | Nevis | 356/484 |
| 2001/0028460 A1* | 10/2001 | Maris et al. | 356/432 |
| 2002/0179912 A1 | 12/2002 | Batchko et al. | |
| 2004/0095981 A1* | 5/2004 | Momiuchi et al. | 372/70 |
| 2004/0258117 A1 | 12/2004 | Nebel et al. | |

FOREIGN PATENT DOCUMENTS

JP 2002-305344 * 10/2002

OTHER PUBLICATIONS

U.S. Appl. No. 60/663,503, Luo.

* cited by examiner

*Primary Examiner*—Minsun Oh Harvey
*Assistant Examiner*—Michael Pan

(57) ABSTRACT

A method, an apparatus, and a module for producing dual beam from a single laser diode provide for means of simultaneously pumping two individual gain media with orthogonal polarizations. A beam splitter splits the emissive laser beam into two portions based on the polarization. A polarization control element or mechanism adjusts the polarization and the intensity ratio of the separated beam portions. Applications to monolithic microchip lasers include generating new wavelengths based on intracavity beam combining and mixing.

2 Claims, 9 Drawing Sheets

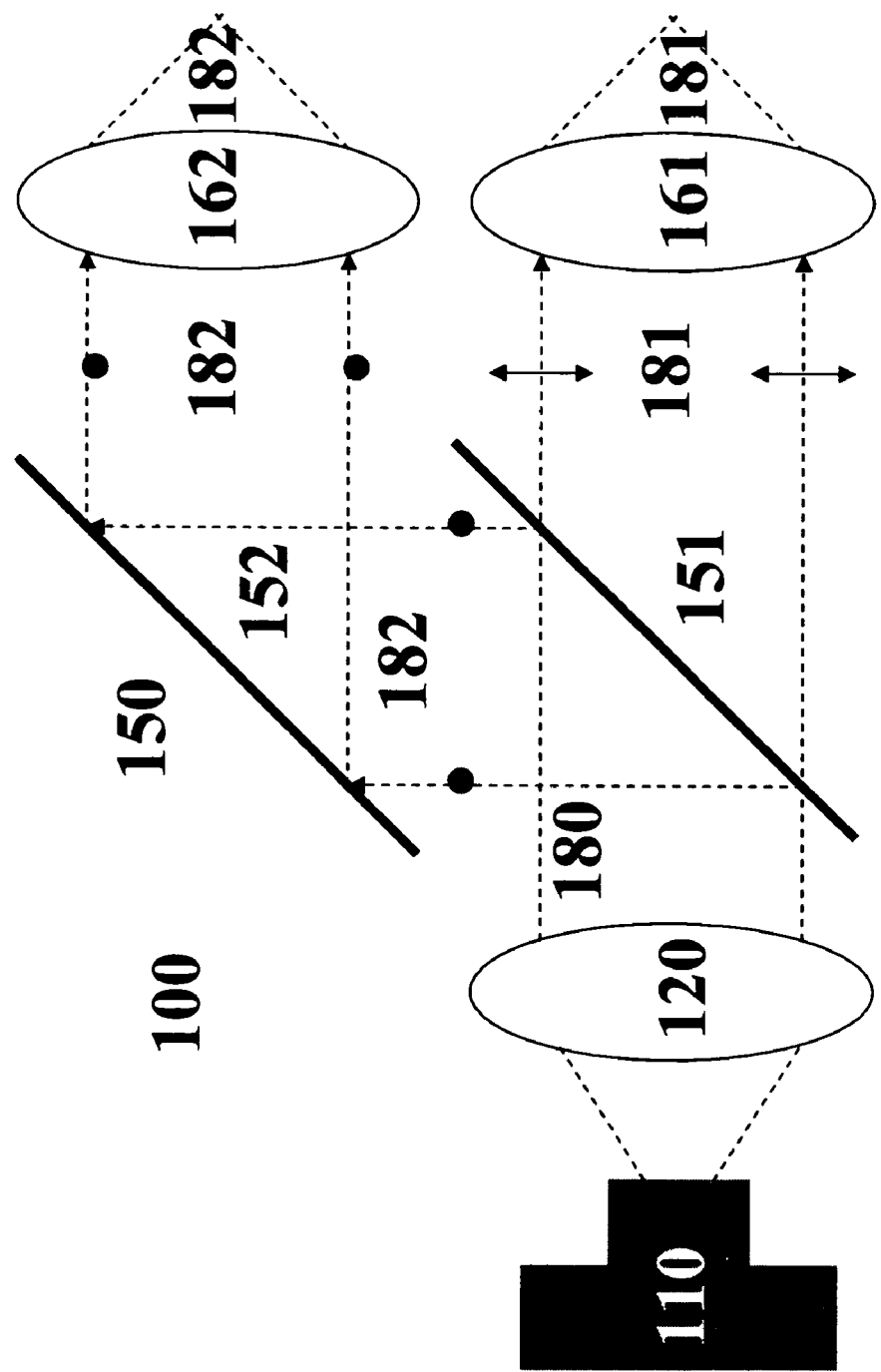

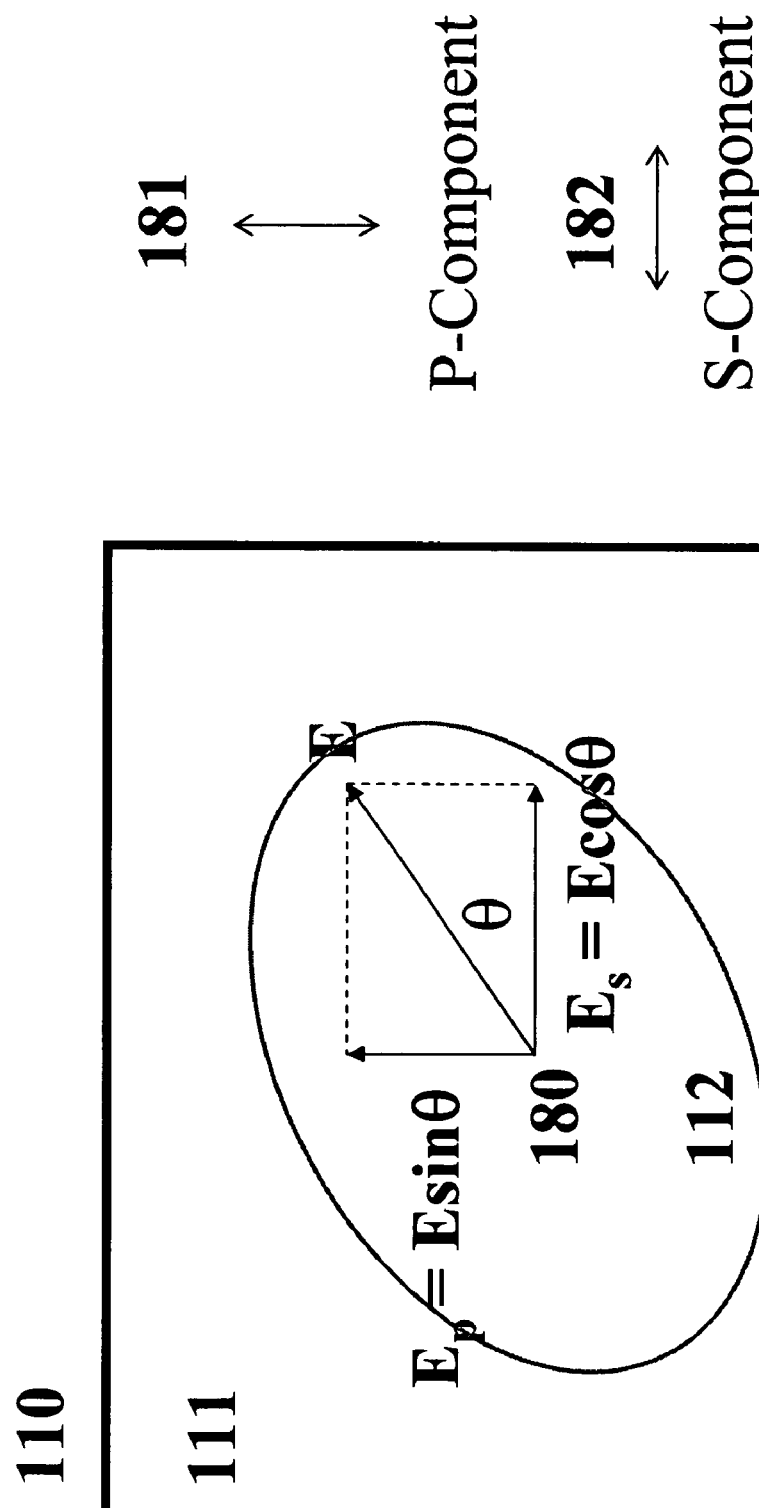

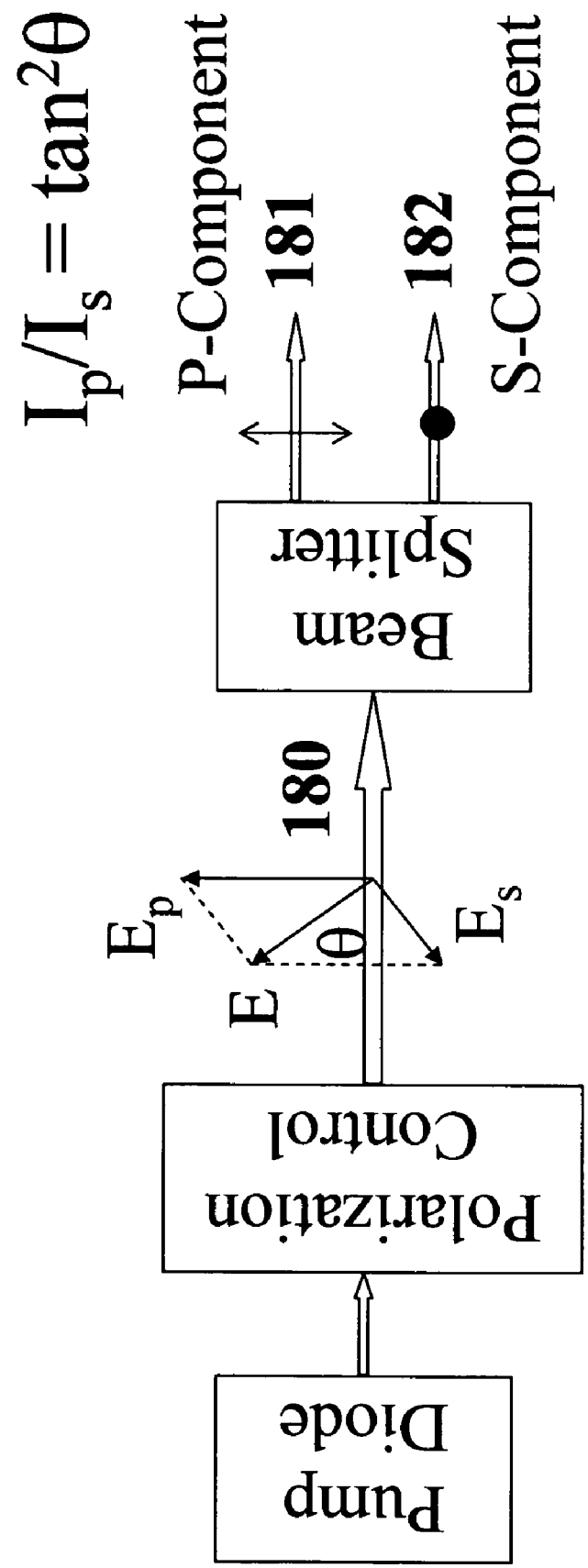

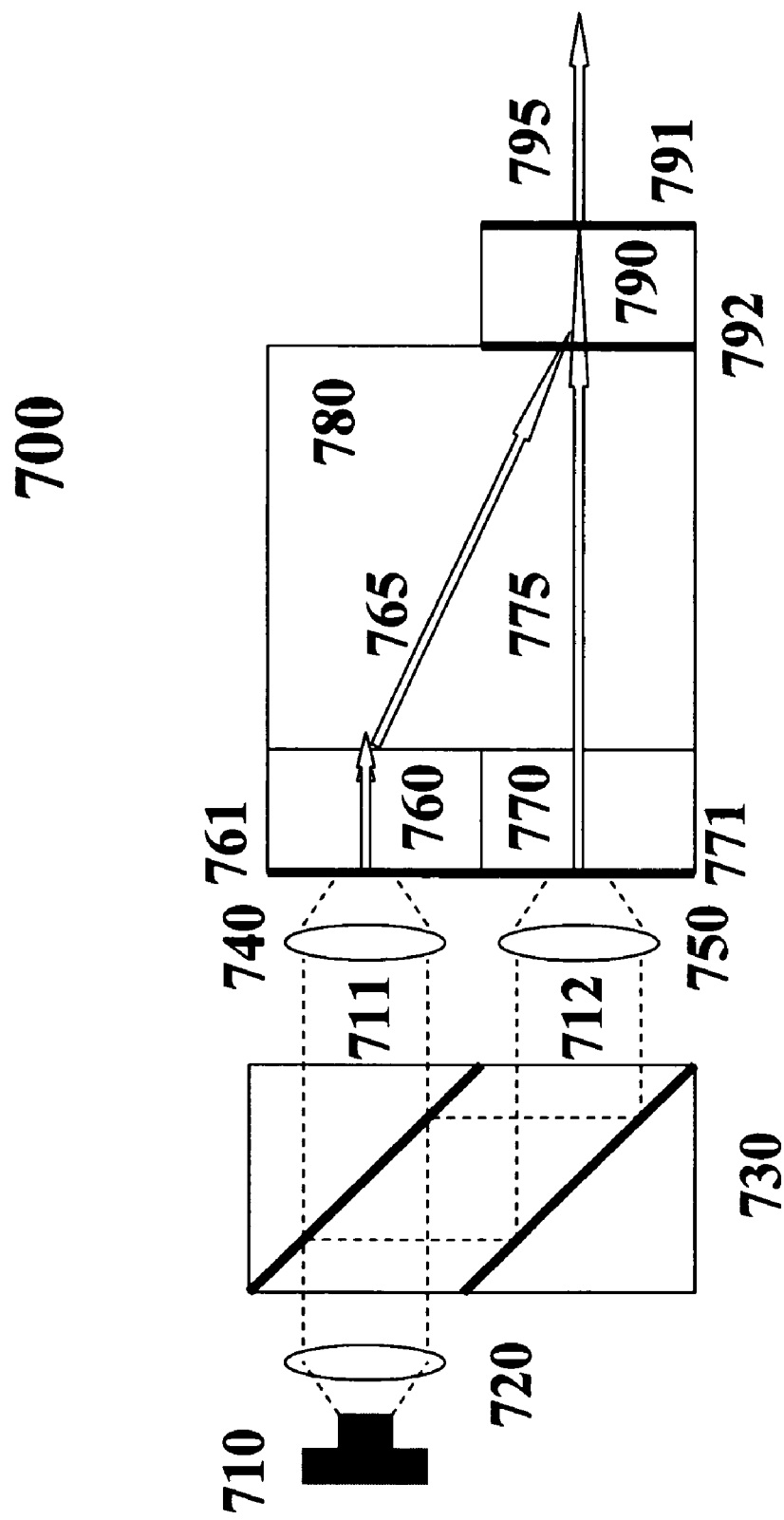

Optimized 491 nm Output

METHOD, APPARATUS AND MODULE USING SINGLE LASER DIODE FOR SIMULTANEOUS PUMP OF TWO GAIN MEDIA CHARACTERISTIC OF POLARIZATION DEPENDENT ABSORPTION

FIELD OF THE INVENTION

This invention relates generally to diode pumped solid-state (DPSS) lasers, in particular to design of compact and efficient pump sources, and more particularly to intracavity frequency conversion using a single laser diode for simultaneously pumping two independent gain media characteristic of polarization dependent absorption.

BACKGROUND OF THE INVENTION

In U.S. Provisional Application No. 60/663,503, titled as "Monolithic Microchip Laser With Intracavity Beam Combining And Sum Frequency Or Difference Frequency Mixing", Luo, Zhu, and Lu have disclosed a low-noise monolithic microchip laser, wherein intracavity beam combining and sum frequency mixing (SFM) or difference frequency mixing (DFM) are used for generation of various lasing wavelengths. According to their invention, two fundamental laser beams are generated from two lasing media pumped by two laser diodes in an integrated dual laser cavity. These two fundamental laser beams are then combined in an intracavity birefringence crystal based on the walk-off effect to generate the desired wavelength by means of intracavity SFM or DFM in a nonlinear optical (NLO) crystal.

One of the advantages of the monolithic microchip laser is compact size. There still remain rooms for improvement, however. Since the walk-off angle is a function of the birefringence and the cut angle, a reduction in the separation of the pump diodes will proportionally reduce the length of the birefringence crystal, and consequently, the device size. This is the issue that will be addressed in the present invention.

DESCRIPTION OF RELATED ART

A basic requirement for the paired pump sources employed for a monolithic microchip laser based on intracavity beam combining and SFM or DFM scheme such as the one disclosed in U.S. Provisional Application No. 60/663,503 is that their polarizations must be mutually orthogonal. This can be achieved by, e.g., splitting the light from a single emitter through polarization sensitive beam splitting elements. As a matter of fact, optical polarization beam combiners or splitters are used in many applications.

For example, Nikolov, et al. in U.S. Pat. No. 6,876,784 demonstrated an optical device for combining two orthogonally polarized beams or splitting a beam into two orthogonally polarized beams using a thin film wire-grid polarizer. This and other patents referenced therein are primarily for optical fiber communication applications.

As another example, in U.S. Pat. No. 6,137,820, Maag, et al. claimed an optically pumped laser, wherein a light beam is split into two components, one of which then passes through a polarization-rotating element to rotate the polarization by an angle of 90°. These two beams of parallel polarizations are individually directed to a gain medium having polarization-dependent absorption from both sides or superimposed on one face of the crystal.

As another example, in United States Patent Application No. 20040258117, Nebel et al. combined two pump sources emitting light at different wavelengths and of orthogonal polarizations to enhance optical pumping of materials exhibiting polarization dependent absorption.

As another example, in United States Patent Application No. 20020179912, Batchko, et al. described a monolithic polarization-insensitive wavelength converter system comprising a polarization separator, a polarization rotator and a wavelength converter.

In spite of these successes, the prior art has limited applications and, in particular, is not applicable to monolithic systems requiring two pump beams with mutually orthogonal polarizations such as the one described in U.S. Provisional Application No. 60/663,503.

SUMMARY OF THE INVENTION

It is therefore an object of the present invention to provide a method and associated apparatus and module for realizing simultaneous pump of two independent gain media by dual beam from a single laser diode. In particular, these gain media can be characteristic of polarization sensitive absorption and can be oriented so that their preferable absorption directions are mutually orthogonal.

It is another object of the present invention to provide a method and associated apparatus and module so that the intensity ratio of the pump beams can be properly adjusted to optimize the laser performance.

A further object of the present invention is that the inventive structure can be integrated into a monolithic microchip laser using intracavity beam combining and frequency mixing such as the one described in U.S. Provisional Application No. 60/663,503.

These objects can be accomplished by introducing a polarization control element or mechanism for managing the polarization orientation of the diode emission and by splitting the diode emission into two portions with mutually orthogonal polarizations.

According to the present invention, diode emission is split via polarized light separating dielectric coated thin films. When a light hits such films, one component with favorable polarization is transmitted, while the other component with orthogonal polarization is reflected. At least one surface coated with such films and at lease one additional surface, which is highly reflective to the incident light wavelength and polarization, are needed to get the desired dual beam. With proper selection of the orientation and separation of these surfaces, various direction and separation of the dual beam can be obtained. Advantageously, the beam split element may be a pair of parallel mirrors with polarization-sensitive coatings and oriented with 45° relative to the light propagation direction. Alternatively, such mirrors may be replaced with appropriately coated prisms or polarized beam splitters (PBS) or a combination of the above. A further alternative is the replacement of both polarization-sensitive mirrors with a double PBS prism.

Also advantageously, the polarization of the diode emission is rotated to a desired orientation through a polarization control element or mechanism. In one preferred embodiment, the polarization control is a mechanism comprising physical orientation of a free-space emitter. In another preferred embodiment, the polarization control element is a half wave plate or other polarization rotator. In yet another preferred embodiment, the polarization control element is built in the light delivery system of a fiber coupled diode.

BRIEF DESCRIPTION OF THE DRAWINGS

This invention may be more completely understood by reading the following detailed description of various embodiments in connection with the accompanying drawings, in which:

FIG. 1A is a schematic illustration of a first embodiment of a dual beam pump from a single laser diode according to the present invention.

FIG. 1B is a top-view of the pump laser diode and the associated polarization control mechanism according to the first embodiment of the present invention.

FIG. 6 is a flowchart of a pump beam split scheme according to the present invention.

FIG. 7A is a schematic illustration of an exemplary application of the present invention to a monolithic microchip laser for generation of 491 nm laser.

DETAILED DESCRIPTION OF THE INVENTION

Figure 2:
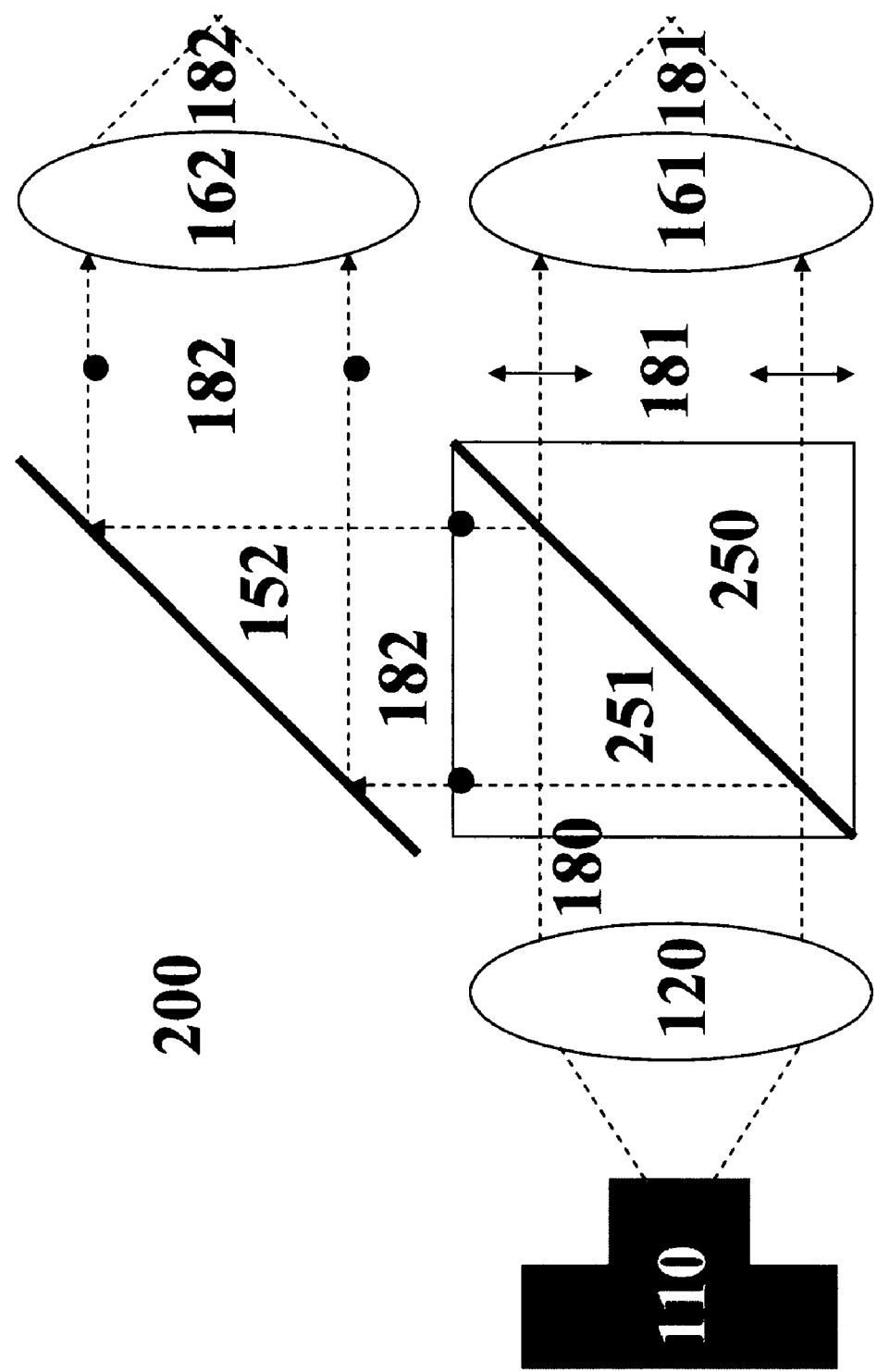
FIG. 2 is a schematic illustration of a second embodiment of a dual beam pump from a single laser diode according to the present invention.

Referring now to the drawings and in particular to FIG. 1A, wherein a first embodiment of dual beam pump from a single laser diode constructed according to the present invention is shown in a schematic form. The inventive dual beam pump source 100 includes a laser diode 110, in particular, a free-space emitter for emitting light, a beam shaping element 120 for collimating the diode emission, two coated mirrors 151 and 152 for light separation, and two additional beam shaping elements 161 and 162 for focusing the output beams. The beam shaping elements 120, 161 and 162 may be separated lenses or integrated micro lenses or lens arrays.

Preferably, the mirror 151 is coated with polarized light separating film on at least one optical surface. In accordance with our inventive teachings, the film transmits light polarized in the preferred direction, e.g., p-component, and reflects light polarized in the other direction, e.g., s-component. The mirror 152 is highly reflective to the s-component of the light 180 emitted from the laser diode 110 and remains the polarization after reflection. These two mirrors are oriented in parallel with each other and 45° relative to the diode emission propagation direction. When the light beam 180 hits the first mirror 151, one component 181 passes and is focused at a desired location through the lens 161 to form the first pump beam 181. The other component 182 is reflected on the surfaces of the mirrors 151 and 152 and is focused at a desired location through the lens 162 to form the second pump beam 182. With this configuration, the pump beams 181 and 182 are parallel to each other and are separated by $\sqrt{2}$ times the distance between the two mirrors. With proper selection of the orientation and separation of the mirrors 151 and 152, various orientation and separation of the beams 181 and 182 can be obtained.

One of the advantages of the present invention is that by rotating the diode emission polarization to an appropriate direction, the intensity ratio of the component 181 and component 182 is adjustable. When applied to a frequency conversion system, this scheme may lead to optimization of the frequency mixing efficiency. According to the first embodiment of our invention, optimized polarization orientation of the diode emission is achievable via a mechanism schematically illustrated by a top-view of the laser diode 110, as shown in FIG. 1B.

As displayed in this graph, an emitting device 112, which provides for the emissive beam 180, is packaged in a housing 111. The polarization of the emissive beam is preferably adjusted by physical rotation of the emitting device before packaging, which may be chosen from a variety of options such as C-mount with an open heat sink for compactness and versatility, high-heat-load (HHL) for increased thermal management, and TO can for straightforward incorporation of diode lasers at the production level. Single free-space diodes typically emit optical powers of 2 W to 5 W, depending on wavelength. Typically, the emitter area is in the order of 1 μm×100 μm and the polarization may be transverse electric (TE) or transverse magnetic (TM).

With our inventive teachings, only one laser diode is needed to simultaneously excite two independent gain media with adjustable pump intensity ratio. Preferably, the polarization of each pump light matches the absorption characteristics of the corresponding gain medium. In case the gain medium is neodymium-doped yttrium vanadate, a pump light of 808 nm with π polarization is preferred.

As can be appreciated by those skilled in the art, our inventive teachings allow for a great degree of freedom in the design practice. For example, as shown in FIG. 2, the polarization sensitive mirror 151 in FIG. 1A can be replaced by a single PBS 250 with one inclined intermediate layer 251, which is composed of at least one polarized light separating membrane(s) and at least one adhesive layer(s) that bond the membrane(s) to the optical surface(s). Preferably, the intermediate layer 251 transmits the p-component 181 of the diode emission 180 and reflects the s-component 182. Again, the orientation and separation of the pump beams 181 and 182 are determined by the relative orientation and separation of the intermediate layer 251 and the reflective mirror 152.

Figure 3:
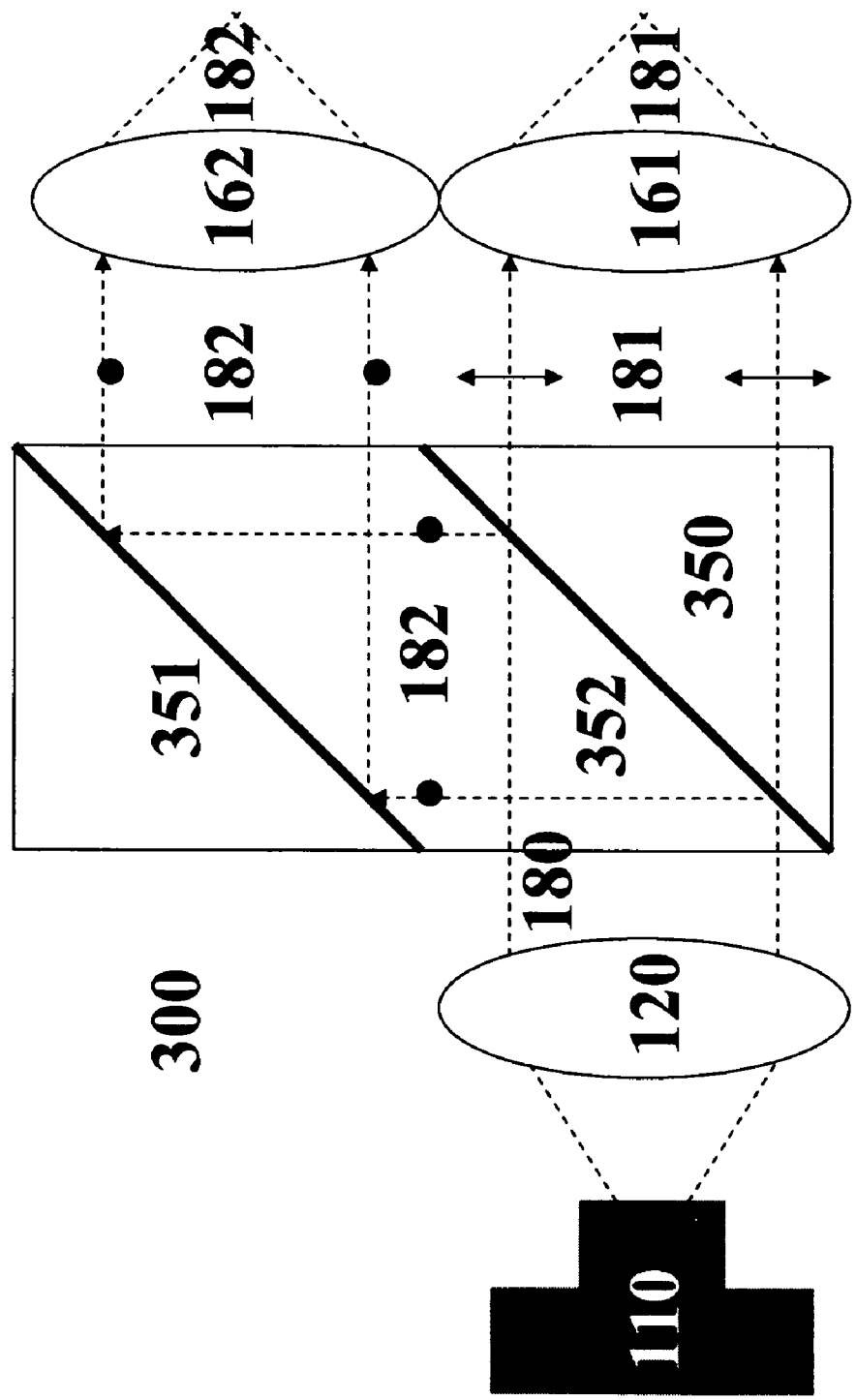
FIG. 3 is a schematic illustration of a third embodiment of a dual beam pump from a single laser diode according to the present invention.

Another variation of the beam split element is shown in FIG. 3, wherein the parallel mirrors 151 and 152 shown in FIG. 1A are replaced with a double PBS 350 for splitting the incident light 180. In the polarized beam splitter 350, there are two parallel intermediate layers 351 and 352, each is composed of at least one polarized light separating membrane(s) and at least one adhesive layer(s) that bond the membrane(s) to the optical surface(s). At the pump wavelength, the intermediate layers 351 and 352 transmit light component 181 polarized in the preferable direction, e.g. p-component, and reflect light component 182 polarized in the orthogonal direction, e.g., s-component.

Whether to use one or two mirrors, labeled as 151 and 152 in FIG. 1A, or use one single PBS, labeled as 250 in FIG. 2 and one highly reflective mirror 152, or use a double PBS, which is labeled as 350 in FIG. 3, or a combination of the above, is a matter of design. Of course, there are many other options, comprising at least one optical surface coated with polarized light separating membrane or film.

Figure 4:
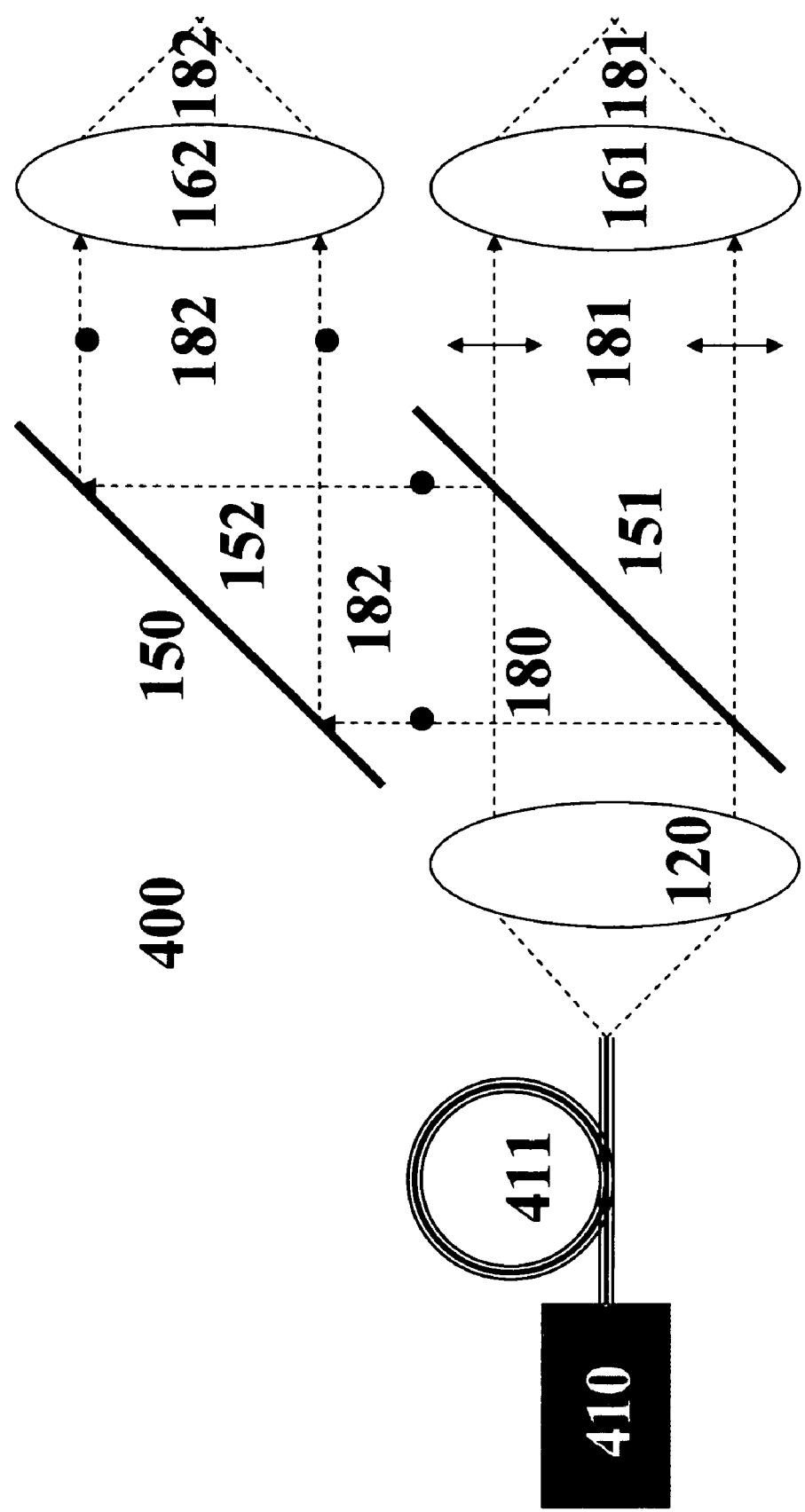
FIG. 4 is a schematic illustration of a fourth embodiment of a dual beam pump from a single laser diode according to the present invention.

FIG. 4 shows a fourth embodiment of the present invention, in which a fiber-coupled emitter 410 is employed as the light source, together with integrated polarization control. Fiber-coupled pump laser diodes is used as one of the most popular formats for laser diodes. Typically, the fiber core diameter is in the order of 100 μm for a single emitter laser diode and the fiber length may vary. As is well known, the light polarization tends to be randomized due to propagation through a non-polarized fiber, or fiber optic devices for de-polarization purpose. For fiber length around 1 m, the randomization becomes complete and the emissive beam 180 is randomly polarized with uniform distribution along any direction. Upon interaction with the beam split element 151, the emissive beam is split into p-component 181 and s-component 182 with identical intensities.

Figure 5:
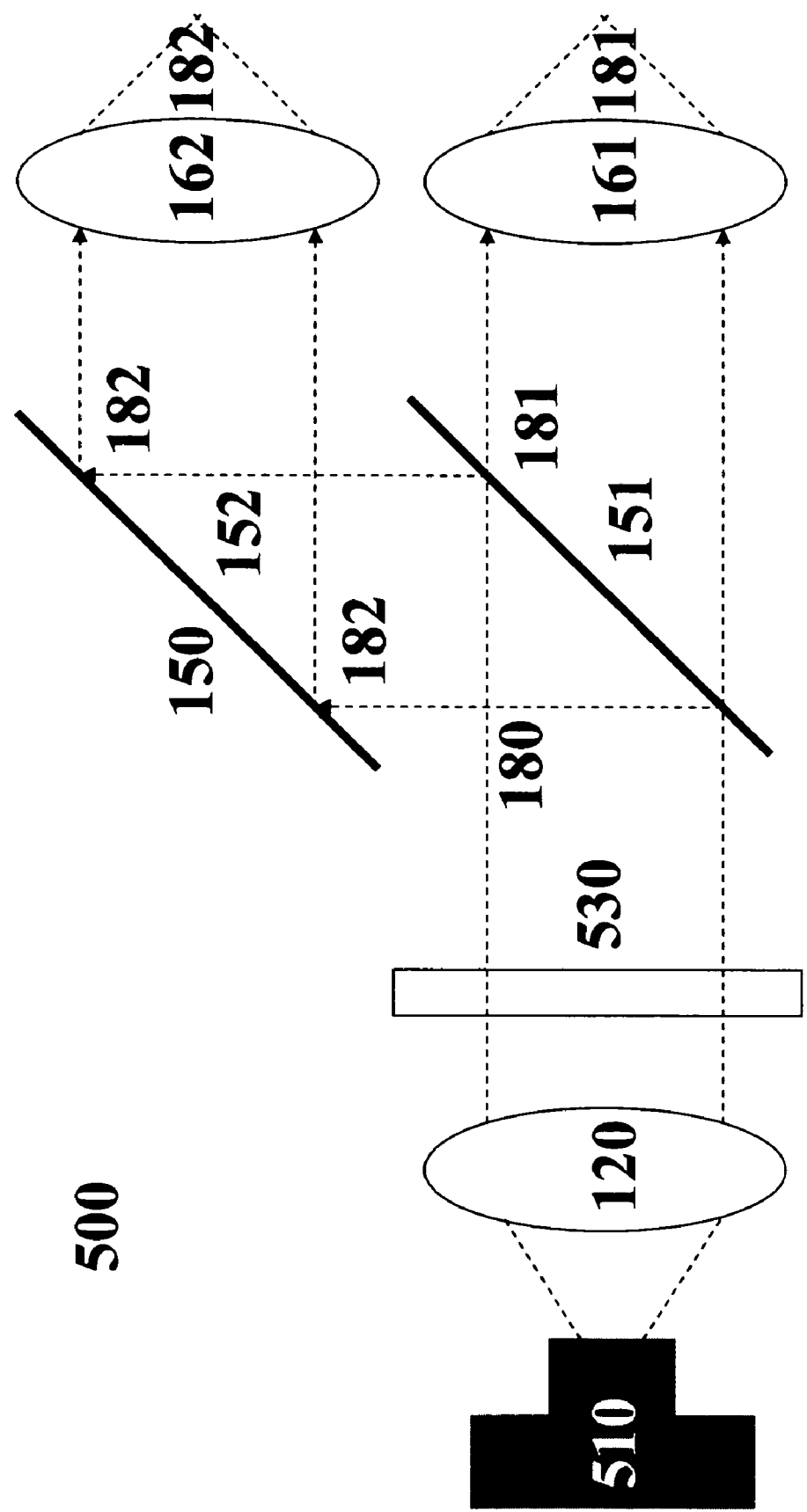
FIG. 5 is a schematic illustration of a fifth embodiment of a dual beam pump from a single laser diode according to the present invention.

A fifth embodiment of the present invention is shown in FIG. 5, in which the polarization control element is a half wave plate 530. Inserted in the optical path, the half wave plate 530 rotates the diode emission polarization to a desired orientation. The beam split element 150, which, in this FIG. 5, is a pair of parallel mirrors 151 and 152 but can also be composed of other polarization sensitive components or their combinations as described in the forgoing text, splits the emission beam 180 into two components 181 and 182. Advantageously, the intensity ratio of the beams 181 and 182 is adjustable according to the polarization of beam 180.

With reference now to FIG. 6, where is shown a flowchart of a pump beam split scheme according to the present invention. In accordance with our inventive teachings, the polarization control, which can be physical orientation of a free-space emitter or optical rotation through a half wave plate or other polarization rotator, rotates the polarization direction of the pump beam 180 emitted from the pump diode to an angle θ relative to the s-direction. Advantageously, this action may be accomplished under automatic control of an integrated computer. The beam splitter transmits the light component with polarization along the p-direction to form the first output (beam 181) and reflects the other light component with polarization along the s-direction to form the second output (beam 182). The intensity ratio of the first output to the second output is proportional to $\tan^2\theta$, which may be optimized via an appropriate algorithm and adjustment of the polarization direction θ.

As can be appreciated by those skilled in the art, our inventive teachings are particularly useful for monolithic microchip lasers employing intracavity beam combining and frequency mixing for generating laser beam at a wavelength not directly available from a laser diode or a diode pumped solid-state laser such as the one disclosed in U.S. Provisional Application No. 60/663,503. For the sake of description, an exemplary application of the present invention is demonstrated in FIG. 7A.

As shown in this FIG. 7A, a monolithic microchip laser 700 consists of a free-space pump diode 710, three beam shaping elements 720, 740, and 750, a double PBS 730 as beam splitter, two Nd:YVO$_4$ laser gain media 760 and 770, an un-doped YVO$_4$ crystal 780, and a nonlinear crystal KTP 790. These crystals are optically bound and in physical contact for elimination of the boundary optical loss.

In order to produce laser output at 491 nm, the exterior surface 761 of the gain medium 760 is coated with materials highly reflective (HR) at 1064 nm while highly transmissive (HT, T>95%) at 808 nm. Similarly, the exterior side 771 of the gain medium 770 is coated HR at 914 nm and HT (T>95%) at 808 nm. The coating 771 should also be HT at 1064 nm and 1342 nm to prevent these high-gain transitions from lasing. The coating 791 on another side of the microchip laser 700 is HT at 491 nm (T>95%), and HR at both 914 and 1064 nm. The coating 792 between the crystals 780 and 790 is highly reflective to the mixed wavelength 491 nm and antireflective to the fundamental wavelengths 914 nm and 1064 nm. The mirrors 761 and 791 form a cavity resonating at the first fundamental wavelength 1064 nm, while the mirrors 771 and 791 form a cavity resonating at the second fundamental wavelength 914 nm.

In operation, the laser diode 710 emits light with wavelength of 808 nm and the desired polarization. The light is collimated through the beam-shaping element 720 and is split into two portions 711 and 712 with mutually orthogonal polarizations due to interactions with the polarized beam splitter 730. Preferably, the beams 712 and 712 are polarized along the π directions of their corresponding gain media 760 and 770 for favorable absorption. Upon excitation from the ground state $^4I_{9/2}$ to the metastable state $^4F_{3/2}$ by these two pumping sources, the laser gain media 760 and 770 produce stimulated emissions respectively at 1064 nm and 914 nm wavelengths. Two fundamental laser beams are thus formed within their respective resonators.

According to our inventive teachings, the gain medium 760 is so oriented that the first fundamental beam 765 with wavelength of 1064 nm is an e ray relative to the un-doped YVO$_4$ crystal 780. Similarly, the orientation of the gain medium 770 makes the second fundamental beam 775 with wavelength of 914 nm an o ray within 780. Owing to the walk-off effect, these two beams are combined at the interface 792 between the undoped YVO$_4$ crystal 780 and the nonlinear optical crystal 790. With precise control of the undoped YVO$_4$ crystal length, the two fundamental beams collinearly enter the nonlinear optical crystal KTP 790 and frequency mixing takes place. Through the output coupler 791, a new laser beam 795 with the reduced wavelength 491 nm outputs. This monolithic microchip laser provides for a promising replacement of argon ion lasers.

One of the advantages of the present invention is capable of producing dual beam with short separation. With integration of micro-lenses or micro-lens arrays for beam collimating/focusing, it is possible to reduce the beam separation to 1 mm or shorter. This feature is beneficial to intracavity frequency conversion based on the walk-off effects because the length of the birefringence crystal thus required is proportionally reduced, resulting in more compact structure and lower cost.

Another advantage of the present invention is that by adjusting the polarization of the light emitted from the pump diode, both the pump efficiency and the wavelength conversion efficiency can be optimized. For better understanding, a numerical analysis is conducted.

Figure 7B:
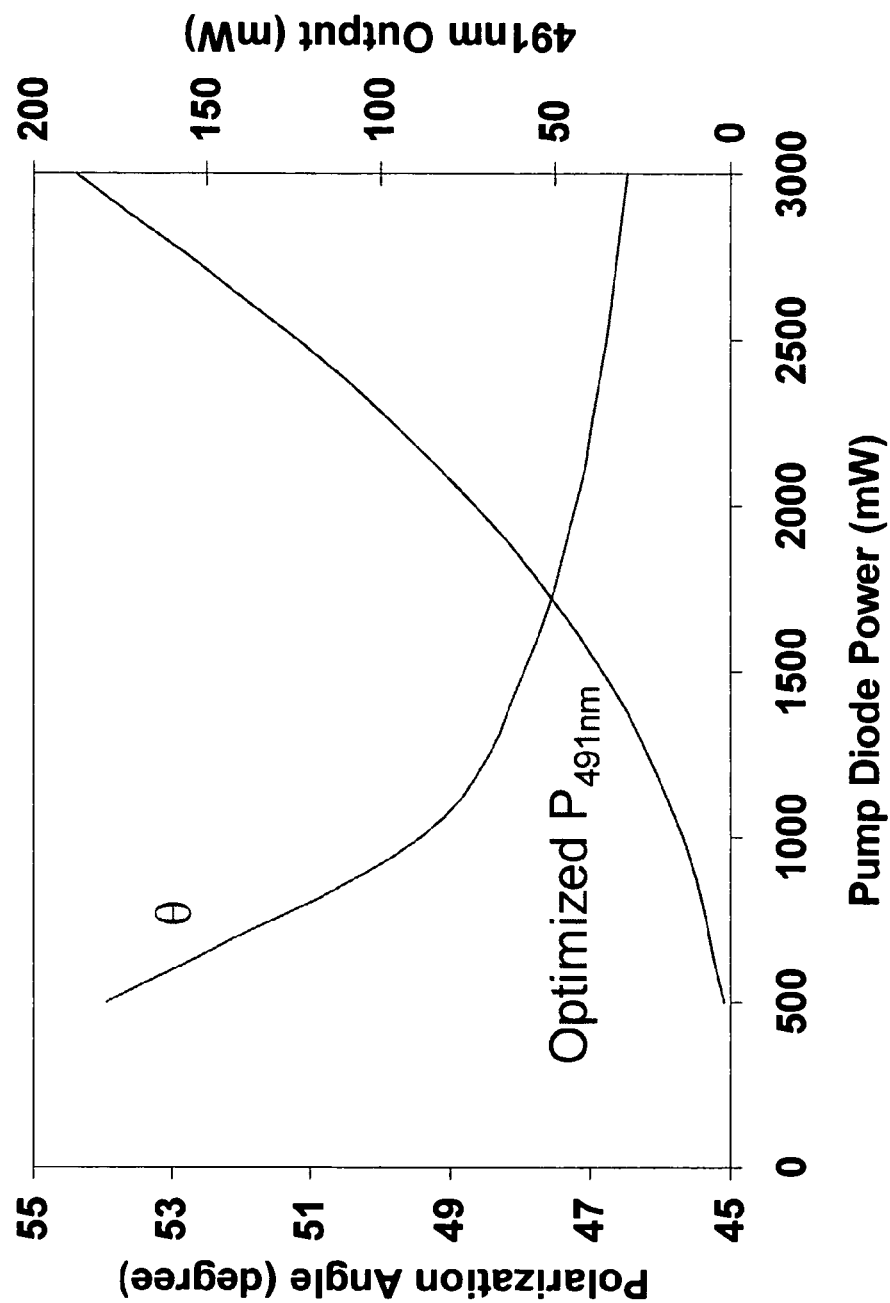
FIG. 7B shows optimized polarization orientation as a function of the optical power from the laser diode and the optimized performance of the laser demonstrated in FIG. 7A.

Plotted in FIG. 7B are curves representing the optimized performance of the monolithic microchip laser demonstrated in FIG. 7A. In particular, the polarization of the laser diode 710 is so chosen as to form an angle θ relative to the π direction of the gain medium 760, wherein the first fundamental wavelength 1064 nm is generated. With this orientation, the intensity ratio of beam 775 to beam 765 is proportional to $\tan^2\theta$. As evidenced from this FIG. 7B, θ decreases as the pump power increases. For sufficiently high pump power, the optimized intensity ratio approaches to one. In this case, a fiber-coupled single emitter can also be employed as the pump source. Another finding in this figure is that more than 70 mW laser output at 491 nm can be achieved from a pump diode that produces optical power of 2 W.

What is claimed is:

1. A module for producing stable and low-noise laser output at a wavelength that cannot be directly emitted from a solid-state gain medium comprising:

two independent gain media characteristic of polarization dependent absorption;

a single light source selected from the group including a laser diode, a free-space single emitter, a diode bar, a diode array, a fiber-coupled single emitter, a fiber-coupled bar, and a fiber bundle array;

a polarization control element or mechanism for rotating the light source polarization such that the two independent gain media emit laser beams at desired wavelengths with a desired intensity ratio;

a light delivery system for directing the light source to the beam split element, further comprising a fiber, and/or a set of separate lenses or micro lenses;

a beam split element for splitting the incident light through interactions with one or more polarization sensitive surface(s);

an electrical control system for driving the light source and for optionally controlling the polarization of the light source;

an optional thermoelectric cooler for automatic temperature control of pump diodes and laser device; and an interface for exiting and coupling the produced dual beam with a particular application, wherein:

said application is performed in one or more nonlinear optical crystal(s);

said two independent gain media are so oriented that their preferable absorption directions are mutually orthogonal;

said gain media and nonlinear optical crystals are optically bonded each other to form a monolithic microchip laser;

whereby said module is a compact and efficient diode pumped solid-state laser featured with intracavity frequency conversion.

2. A module as of claim 1, wherein:

said application is intracavity beam combining and frequency mixing, including a monolithic microchip laser, further including an all-solid-state laser for producing 491 nm coherent light as a replacement of argon ion laser.

* * * * *